United States Patent
Dohi et al.

(10) Patent No.: US 9,507,352 B2
(45) Date of Patent: Nov. 29, 2016

(54) VARIABLE ORIFICE TYPE PRESSURE-CONTROLLED FLOW CONTROLLER

(71) Applicant: FUJIKIN INCORPORATED, Osaka (JP)

(72) Inventors: Ryousuke Dohi, Osaka (JP); Kouji Nishino, Osaka (JP); Yohei Sawada, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 13 days.

(21) Appl. No.: 14/397,105

(22) PCT Filed: Apr. 1, 2013

(86) PCT No.: PCT/JP2013/002244
§ 371 (c)(1),
(2) Date: Oct. 24, 2014

(87) PCT Pub. No.: WO2013/161186
PCT Pub. Date: Oct. 31, 2013

(65) Prior Publication Data
US 2015/0114499 A1   Apr. 30, 2015

(30) Foreign Application Priority Data

Apr. 26, 2012   (JP) .................................. 2012-101662

(51) Int. Cl.
*F16K 31/02* (2006.01)
*F16K 31/52* (2006.01)
(Continued)

(52) U.S. Cl.
CPC ............... *G05D 7/0647* (2013.01); *F16K 7/16* (2013.01); *F16K 31/04* (2013.01); *F16K 31/52491* (2013.01); *Y10T 137/87917* (2015.04)

(58) Field of Classification Search
CPC . G05D 7/0647; F16K 7/16; F16K 31/52496; F16K 31/04; Y10T 137/87917; Y10T 137/7759; Y10T 137/776; Y10T 137/7761; Y10T 137/7762; Y10T 137/0396
USPC .................. 137/488, 486, 487.5, 14; 251/251
See application file for complete search history.

(56) References Cited

U.S. PATENT DOCUMENTS 4,650,159 A * 3/1987 Shimamura ............. B60T 13/72
                                                        137/596.17
5,146,941 A * 9/1992 Statler .................. G05D 7/0635
                                                        137/468

(Continued)

FOREIGN PATENT DOCUMENTS

JP          63-88618 A       4/1988
JP         11-063265 A       3/1999

(Continued)

OTHER PUBLICATIONS

International Search Report issued in corresponding application PCT/JP2013/002244, completed Apr. 15, 2013 and mailed Apr. 23, 2013.

*Primary Examiner* — Kevin Murphy
*Assistant Examiner* — Minh Le
(74) *Attorney, Agent, or Firm* — Griffin and Szipl PC

(57) ABSTRACT

In a variable orifice type pressure-controlled flow controller that includes a pressure control unit and a variable orifice unit, computes a flow rate of a fluid distributed through an orifice of the variable orifice unit as $Q_{P_1}=KP_1$ ($P_1$ is an orifice upstream side pressure and K is a constant), and switches a flow control range and performs flow control in the flow control range by changing a set flow rate signal Qs for a flow rate arithmetic and control unit of the pressure control unit and an orifice opening degree setting signal Qz for an orifice opening degree arithmetic and control unit of the variable orifice unit, the variable orifice unit includes the orifice opening degree arithmetic and control unit.

11 Claims, 12 Drawing Sheets

(51) Int. Cl.
*G05D 7/06* (2006.01)
*F16K 7/16* (2006.01)
*F16K 31/524* (2006.01)
*F16K 31/04* (2006.01)

(56) References Cited

U.S. PATENT DOCUMENTS

| | | | | |
|---|---|---|---|---|
| 5,284,319 A * | 2/1994 | Baumann | F16K 7/02 | 251/214 |
| 5,413,311 A * | 5/1995 | Arstein | F16K 7/16 | 251/229 |
| 5,551,477 A * | 9/1996 | Kanno | F16K 31/524 | 91 137/553 |
| 5,669,408 A * | 9/1997 | Nishino | G05D 7/0635 | 137/486 |
| 5,816,285 A * | 10/1998 | Ohmi | G05D 7/0635 | 137/486 |
| 5,865,205 A * | 2/1999 | Wilmer | G05D 7/0635 | 137/2 |
| 6,152,168 A * | 11/2000 | Ohmi | G05D 7/0647 | 137/486 |
| 6,289,923 B1 * | 9/2001 | Ohmi | G05D 7/0635 | 137/486 |
| 6,314,992 B1 * | 11/2001 | Ohmi | G05D 7/0635 | 137/486 |
| 6,363,958 B1 * | 4/2002 | Ollivier | G05D 7/0647 | 137/2 |
| 6,512,960 B1 * | 1/2003 | Schulz | G05B 19/19 | 137/487.5 |
| 6,913,031 B2 * | 7/2005 | Nawata | G05D 7/0635 | 137/12 |
| 6,971,628 B2 * | 12/2005 | Ichimaru | F16K 11/044 | 137/625.27 |
| 6,994,319 B2 * | 2/2006 | Yudovsky | C23C 16/45544 | 251/263 |
| 7,069,944 B2 * | 7/2006 | Morikawa | G05D 7/0635 | 137/486 |
| 7,143,995 B2 * | 12/2006 | Perry | F16K 31/04 | 251/251 |
| 7,204,158 B2 * | 4/2007 | Morgan | G05D 7/0647 | 406/10 |
| 8,418,714 B2 * | 4/2013 | Ohmi | G01F 1/363 | 137/486 |
| 8,561,966 B2 * | 10/2013 | Dohi | F16K 7/16 | 251/129.11 |
| 8,881,754 B2 * | 11/2014 | Boe | F01N 3/208 | 137/14 |
| 8,944,095 B2 * | 2/2015 | Okabe | C23C 16/00 | 137/486 |
| 8,979,064 B2 * | 3/2015 | Nomiyama | F16K 37/00 | 137/488 |
| 9,133,951 B2 * | 9/2015 | Ohmi | F16K 27/003 | |
| 2007/0209709 A1 * | 9/2007 | Shimizu | B41J 2/17509 | 137/331 |
| 2010/0139775 A1 | 6/2010 | Ohmi et al. | | |
| 2012/0223265 A1 * | 9/2012 | Sawada | F16K 7/16 | 251/263 |
| 2013/0001453 A1 | 1/2013 | Hirose et al. | | |
| 2014/0083514 A1 * | 3/2014 | Ding | G05D 7/0647 | 137/12 |
| 2014/0130883 A1 * | 5/2014 | Couture | B64D 13/00 | 137/12 |
| 2014/0230915 A1 * | 8/2014 | Mudd | F15B 21/12 | 137/15.08 |
| 2014/0299204 A1 * | 10/2014 | Somani | G01F 15/003 | 137/486 |

FOREIGN PATENT DOCUMENTS

| | | |
|---|---|---|
| JP | 11-345027 A | 12/1999 |
| JP | 3522535 B2 | 2/2004 |
| JP | 3586075 B2 | 8/2004 |
| JP | 2007-004644 A | 1/2007 |
| JP | 2011-154433 A | 8/2011 |

\* cited by examiner

PRIOR ART

PRIOR ART

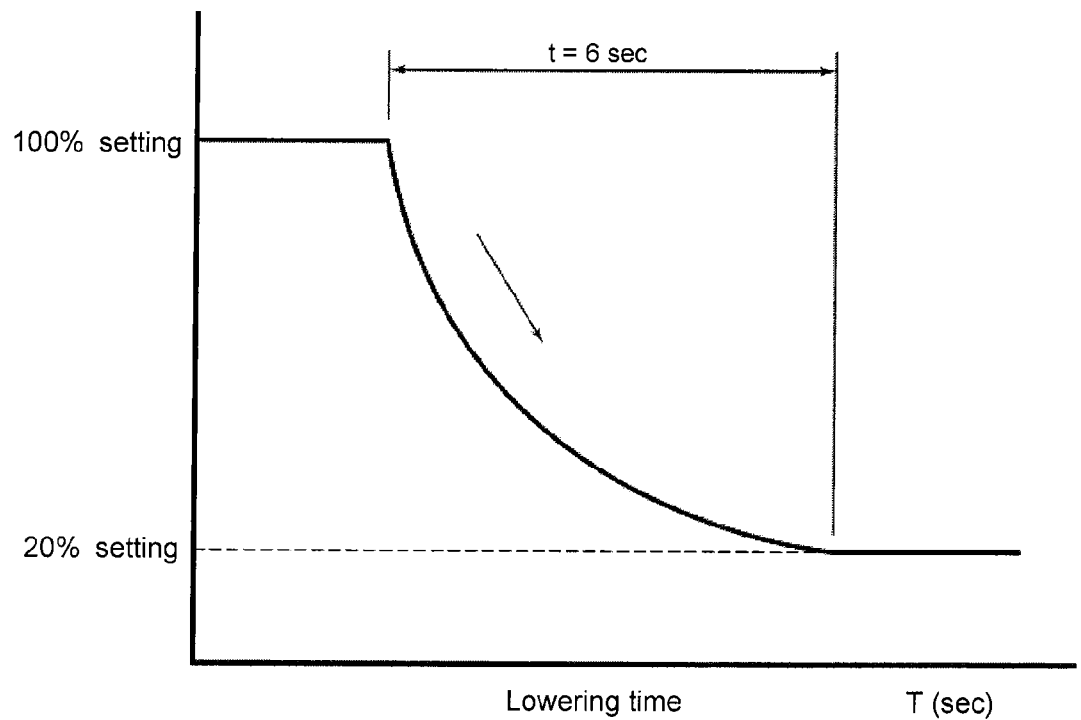

VARIABLE ORIFICE TYPE PRESSURE-CONTROLLED FLOW CONTROLLER

This is a National Phase application in the United States of International Patent Application No. PCT/JP2013/002244 filed Apr. 1, 2013, which claims priority on Japanese Patent Application No. 2012-101662, filed Apr. 26, 2012. The entire disclosures of the above patent applications are hereby incorporated by reference.

TECHNICAL FIELD

The present invention relates to an improvement in a variable orifice type pressure-controlled flow controller to be used in semiconductor manufacturing equipment, etc., and specifically, to a variable orifice type pressure-controlled flow controller that can switch a flow control range and significantly shorten a flow rate lowering time during flow control by improving a drive mechanism, etc., of a variable orifice, and is made adaptable to flow control in a wide flow rate region with a smaller number of types by enabling multistep switching of a control flow rate in the wide flow rate region.

BACKGROUND ART

Conventionally, fixed orifices are generally used in pressure-controlled flow controllers, and by using orifices with orifice hole diameters suitable for maximum control flow rates, flow control in a fixed flow rate region is performed.

However, when fixed orifices are used, orifices with different orifice hole diameters have to be prepared correspondingly to the maximum control flow rates, and therefore, many kinds of pressure-controlled flow controllers with different flow rate ranges are inevitably prepared, and this poses various problems in reducing manufacturing costs and product management, etc.

On the other hand, in order to avoid the various problems in the above-described fixed orifice type pressure-controlled flow controller, the inventors, et al., of the invention of the present application previously invented a variable orifice type pressure-controlled flow control system shown in FIG. 12 and FIG. 13, and disclosed it in Japanese Patent No. 3586075.

That is, this pressure-controlled flow controller 27 includes a pressure control unit A and a variable orifice unit B, and the pressure control unit A includes a pressure control valve 22, a control valve drive unit 23, a pressure detector 24, and an arithmetic and control device 27a, etc.

Further, the variable orifice unit B includes a direct touch type metal diaphragm valve 25 and an orifice drive unit 26, etc., forming the variable orifice and as shown in FIG. 13, a guide slider 38 and a diaphragm presser 36 are moved down by a stroke L by a pulse motor 34 via a ball screw mechanism 39, and, accordingly, a ring-shaped fluid passage (clearance) between a diaphragm 33 and a valve seat 32b, corresponding to an orifice hole, is adjusted and fixed to a set value.

As a matter of course, the actuation stroke L of the orifice drive unit 26 and the flow rate Q distributed through the fluid passage (clearance) are substantially linearly proportional to one another.

To actuate this pressure-controlled flow controller 27, first, a flow rate setting signal Qs and an orifice opening degree setting signal Qz are input into the control device 27a and a control unit 26a of the orifice drive unit 26. Next, when a gas with a predetermined pressure $P_1$ is supplied to a gas inlet 28a, a pressure detection signal $Q_{P1}$ corresponding to an upstream side pressure $P_1$ detected by the pressure detector 24 is input into the control device 27a, and a flow rate $Q=KP_1$ is computed in the control device 27a.

Furthermore, from the control device 27a, a control valve control signal Qy corresponding to a difference from the flow rate setting signal Qs is output, and the pressure control valve 22 is controlled to open and close in a direction to reduce the difference between the Qs and Q.

Still further, in order to change the control flow rate range by varying the hole diameter of the variable orifice 25, the setting of the orifice opening degree setting signal Qz is changed. Accordingly, an orifice control signal Qo changes, and as a result, the actuation stroke L of the orifice drive unit 26 changes, and the orifice hole diameter φ changes.

In FIG. 12 and FIG. 13, the reference symbol 29 denotes a thermal type flow meter, 30 denotes a vacuum chamber, 31 denotes a vacuum pump, 40 denotes a coupling, 41 denotes a bearing, 42 denotes a shaft unit, 35 and 37 denote springs, 32b denotes a valve seat, 32 denotes a main body, 32a denotes a gas inlet passage, and 32e denotes a gas outlet passage.

In the pressure-controlled flow controller 27 shown in FIG. 12 and FIG. 13, a direct touch type metal diaphragm valve is used as a variable orifice, and the control flow rate range is switched by changing the actuation stroke L of the diaphragm. Therefore, the structure of the orifice is simplified and sliding portions are completely eliminated, and dust emission is also almost completely eliminated. In addition, the dead space inside the fluid flow passage is significantly reduced, and gaps that cause gas to be involved in the fluid flow passage are eliminated, and gas replaceability is significantly improved. Furthermore, by changing the actuation stroke L of the diaphragm, the orifice hole diameter can be easily and accurately changed (that is, the flow rate range can be changed), and as compared with the conventional case where a fixed orifice is replaced, excellent practical effects, such as a great improvement in control performance can be obtained.

However, many problems that should be solved still remain in the variable orifice type pressure-controlled flow controller shown in FIG. 12 and FIG. 13. Among the problems, in recent years, shortening of the time to be taken to switch the flow control range has particularly become an issue, and shortening of the time required to switch the setting of the variable orifice 25 itself and significant shortening of the lowering time during use of the set variable orifice have been demanded.

That is, the variable orifice 25 (diaphragm valve) is set to have an opening area suitable for the control flow rate by adjusting the clearance between the diaphragm 33 and the valve seat 32b by adjusting the actuation stroke L of the orifice drive unit 26. However, the orifice drive unit 26 is mainly composed of the ball screw mechanism 39, so that a considerable amount of time (approximately 1 to 3 seconds) is required to adjust the clearance of the variable orifice 25 (orifice opening area setting), and switching of the flow control range cannot be swiftly performed.

Flow control after completion of setting (clearance adjustment) of the variable orifice 25 is performed by adjusting the pressure $P_1$ by the pressure control valve 22, however, for example, to lower the control flow rate from the 100% set flow rate (10 sccm (Standard cubic centimeters per minute)) to 20% (2 sccm) by using an orifice for 10 sccm, as shown in FIG. 14, a lowering time of approximately 6 seconds is required. This FIG. 14 is based on an actual measured value of the lowering time from the 100% set flow rate (10 sccm) to the 20% set flow rate (20 sccm) in the case where a fixed orifice with a hole diameter of 18 μm was used as the orifice for 10 sccm, and the fluid passage volume between the pressure control valve 22 and the orifice was set to 0.2 cc.

The lowering time t=6 seconds in this FIG. 14 was actually measured in the case where a fixed orifice with an orifice hole diameter φ=18 μm was used, and it was found that this lowering time t was mainly caused by a gas existing in the fluid passage volume of 0.2 cc on the upstream side of the orifice, and by reducing the fluid passage volume between the pressure control valve 22 and the orifice, and by an increase in the orifice hole diameter, accordingly, the lowering time t could be shortened.

PATENT DOCUMENTS

Patent Document 1: Japanese Patent No. 3586075
Patent Document 2: Japanese Patent No. 3522535

SUMMARY OF THE INVENTION

The invention of the present application aims to solve the above-described problems in the conventional pressure-controlled flow control system using variable orifices, that is, (a) a problem that it takes time to adjust the orifice hole diameter of the variable orifice itself (opening passage clearance of the metal diaphragm valve), and (b) a problem that due to a long lowering time in flow control by the variable orifice, etc., readiness of flow control by switching of the flow control range by using the variable orifice is low, and the processing efficiency of the semiconductor manufacturing process cannot be improved. The present invention also aims to provide a pressure-controlled flow control system which enables instantaneous setting of the orifice hole diameter of the variable orifice itself, and by first flowing the gas inside the fluid passage between the pressure control valve and the variable orifice to the outside through the variable orifice expanded in diameter to have a large hole diameter and then re-adjusting the hole diameter of the variable orifice substantially instantaneously to a hole diameter for a predetermined set flow rate, enables the lowering time from the 100% set flow rate to the 20% set flow rate to be shortened to substantially one second.

Means for Solving the Problems

According to a first aspect of the present invention, in a variable orifice type pressure-controlled flow controller that includes a pressure control unit and a variable orifice unit, computes a flow rate of a fluid distributed through an orifice of the variable orifice unit as $Q_{P1}=KP_1$ ($P_1$ is an orifice upstream side pressure and K is a constant), uses, as the orifice, an orifice formed of a ring-shaped clearance between a valve seat of a direct touch type metal diaphragm valve and a diaphragm, and the variable orifice type pressure-controlled flow controller switches a flow control range and performs flow control in the flow control range by changing a set flow rate signal Qs for a flow rate arithmetic and control unit of the pressure control unit and an orifice opening degree setting signal Qz for an orifice opening degree arithmetic and control unit of the variable orifice unit, the variable orifice unit includes the orifice opening degree arithmetic and control unit, a stepping motor that is driven in response to an orifice control signal from the orifice opening degree arithmetic and control unit, an eccentric cam that is turned by the stepping motor, and a direct touch type metal diaphragm valve the valve opening degree of which is controlled by the eccentric cam via the diaphragm presser.

According to a second aspect of the present invention, in the first aspect of the present invention, the eccentric cam of the variable orifice unit is formed of a rotary shaft body to which a motor shaft is fixed vertically so that the motor shaft is eccentric by a predetermined distance from the shaft center, a first bearing fixed to the outer peripheral surface of the rotary shaft body, and a flange-shaped cam plate fixed to the outer peripheral surface of the first bearing, and the cam plate is moved by the predetermined distance in the left-right direction in a non-rotating state by turning the rotary shaft body.

According to a third aspect of the present invention, in the first aspect of the present invention, the direct touch type metal diaphragm valve forming the variable orifice unit includes a recess portion having a planar bottom surface formed by drilling on a side surface of the flow controller main body, a valve seat having a desired passage hole diameter formed on the bottom surface of the recess portion, an inverted dish-shaped diaphragm disposed to face the valve seat, a diaphragm presser that is disposed to face the diaphragm and has an outer end portion brought into contact with the outer peripheral surface of the cam plate, and a pressing metal fixture that is screwed and fixed into the recess portion and holds the diaphragm presser movably in the left-right direction, and presses and fixes the outer peripheral edge of the diaphragm.

According to a fourth aspect of the present invention, in the first aspect of the present invention, a contact portion between the outer peripheral surface of the cam plate and the outer end portion of the diaphragm presser is displaced only in the left-right direction when the eccentric cam turns.

According to a fifth aspect of the present invention, in the first aspect of the present invention, the turning angle of the stepping motor is set to 0 to 200 degrees, and in the turning angle range, the diaphragm presser is displaced by a fixed distance in the left-right direction by the eccentric cam.

According to a sixth aspect of the present invention, in the first aspect of the present invention, a displacement sensor is provided at a position axisymmetric to the contact portion between the outer peripheral surface of the cam plate of the eccentric cam and the outer end portion of the diaphragm presser to detect a displacement amount in the horizontal direction of the contact portion according to turning of the cam plate and input a detected orifice opening degree signal into the orifice opening degree arithmetic and control unit.

According to a seventh aspect of the present invention, in the first aspect of the present invention, a control unit including the flow rate arithmetic and control unit of the pressure control unit and the orifice opening degree arithmetic and control unit of the variable orifice unit is arranged to, when the set flow rate signal changes according to switching of the flow control range, input an orifice opening signal into the orifice opening degree arithmetic and control unit simultaneously with the change in the set flow rate signal to increase the orifice opening degree of the variable orifice unit, and after a predetermined time elapses, input a predetermined orifice opening degree setting signal into the orifice opening degree arithmetic and control unit to keep the orifice opening degree at the desired opening degree.

According to an eighth aspect of the present invention, in the seventh aspect of the present invention, the variable orifice opening degree is kept at a degree being 1.5 times or more larger than the opening degree in the set flow rate range for 0.1 to 0.5 seconds, and the lowering time from the 100% set flow rate to a 20% set flow rate during flow control is within 1 second.

According to a ninth aspect of the present invention, in the eighth aspect of the present invention, a fluid passage hole diameter of the valve seat of the direct touch type metal diaphragm valve forming the variable orifice is set to 0.1 to 0.5 mm, and the 100% set flow rate is set to 10 sccm.

According to a tenth aspect of the present invention, in the first aspect of the present invention, a shut-off valve is disposed in the upstream side passage of the variable orifice of the variable orifice unit.

Effects of the Invention

The present invention is constituted so that a variable orifice drive unit 8 includes the eccentric cam 8a and the stepping motor 8b, and by turning the stepping motor 8b by 360 degrees or less, the cam plate $8a_4$ of the eccentric cam 8a is displaced in the left-right direction by a predetermined amount, and without rotating the cam plate $8a_4$, the diaphragm presser 7b of the variable orifice 7 is pressed and moved in the left-right direction by the cam plate $8a_4$ to adjust the clearance between the valve seat $10d_5$ of the variable orifice 7 and the diaphragm 7a (that is, the orifice hole diameter).

As a result, the orifice hole diameter can be extremely swiftly (that is, in approximately 0.1 to 0.5 seconds) and accurately adjusted by the eccentric cam 8a, and the flow rate range of the control flow rate of the flow controller can be extremely swiftly switched.

In the present invention, the flow rate arithmetic and control unit 4a of the pressure control unit 1a and the orifice opening degree arithmetic and control unit 4b of the variable orifice unit 1b form the control unit 4, and when the input value of the flow rate setting signal Qs into the flow rate arithmetic and control unit 4a changes at the time of switching of the control flow rate range, due to the change in the flow rate setting signal Qs, the orifice opening degree setting signal Qz to be input into the orifice opening degree arithmetic and control unit 4b is increased to 1.5 times or more to increase the opening degree of the variable orifice 7 to 1.5 times or more larger than the opening degree in the set flow rate range, and after a predetermined time elapses, the orifice opening degree control signal Qz is adjusted to a set value of the opening degree suitable for the flow rate range after switching of the control flow rate range, whereby performing flow control.

As a result, at the time of switching of the control flow rate, the fluid inside the upstream side fluid passage of the variable orifice 7 is smoothly and swiftly discharged to the downstream side through the orifice hole diameter smoothly and swiftly opened, and even if the valve seat hole diameter of the variable orifice 7 is 0.1 mm and has a small flow rate region the 100% set flow rate of which is 10 sccm, this can be lowered to the 20% set flow rate (2 sccm) in 1 second, so that the lowering time can be significantly shortened.

BRIEF DESCRIPTION OF THE DRAWINGS

FIG. 14 is a systematic diagram showing lowering characteristics at the time of flow control in a small flow rate range (100% set flow rate: 10 sccm) using a conventional fixed orifice.

DETAILED DESCRIPTION OF THE PREFERRED EMBODIMENTS

Figure 1:
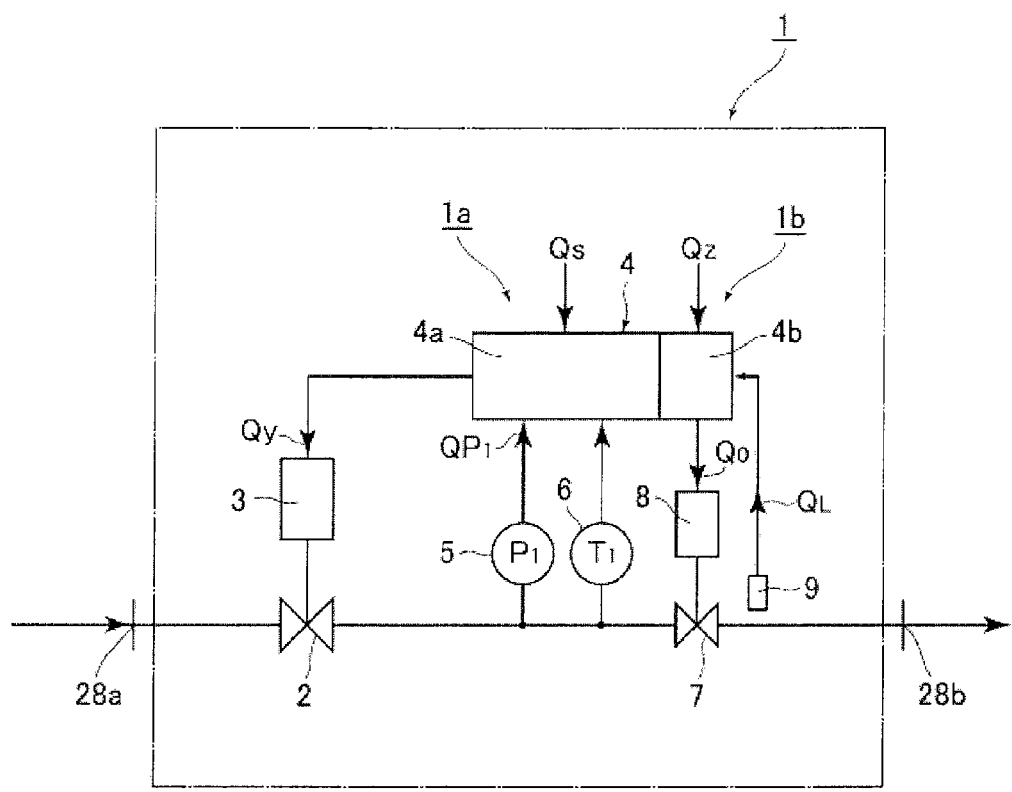
FIG. 1 is a systematic diagram showing a constitution of a pressure-controlled flow controller according to a first preferred embodiment of the present invention.

Hereinafter, preferred embodiments of the present invention are described with reference to the drawings, in which like parts are indicated by like reference numerals.

FIG. 1 is a systematic diagram showing a first preferred embodiment of the present invention. A pressure-controlled flow controller 1 according to the present invention includes a pressure control unit 1a and a variable orifice unit 1b. The pressure control unit 1a is analogous to the pressure control unit A of the conventional pressure-controlled flow controller 27 shown in FIG. 12, and is formed by a pressure control valve 2, a pressure control valve drive unit 3, a flow rate arithmetic and control unit 4a, a pressure detector 5, and a temperature detector 6, etc.

Figure 2:
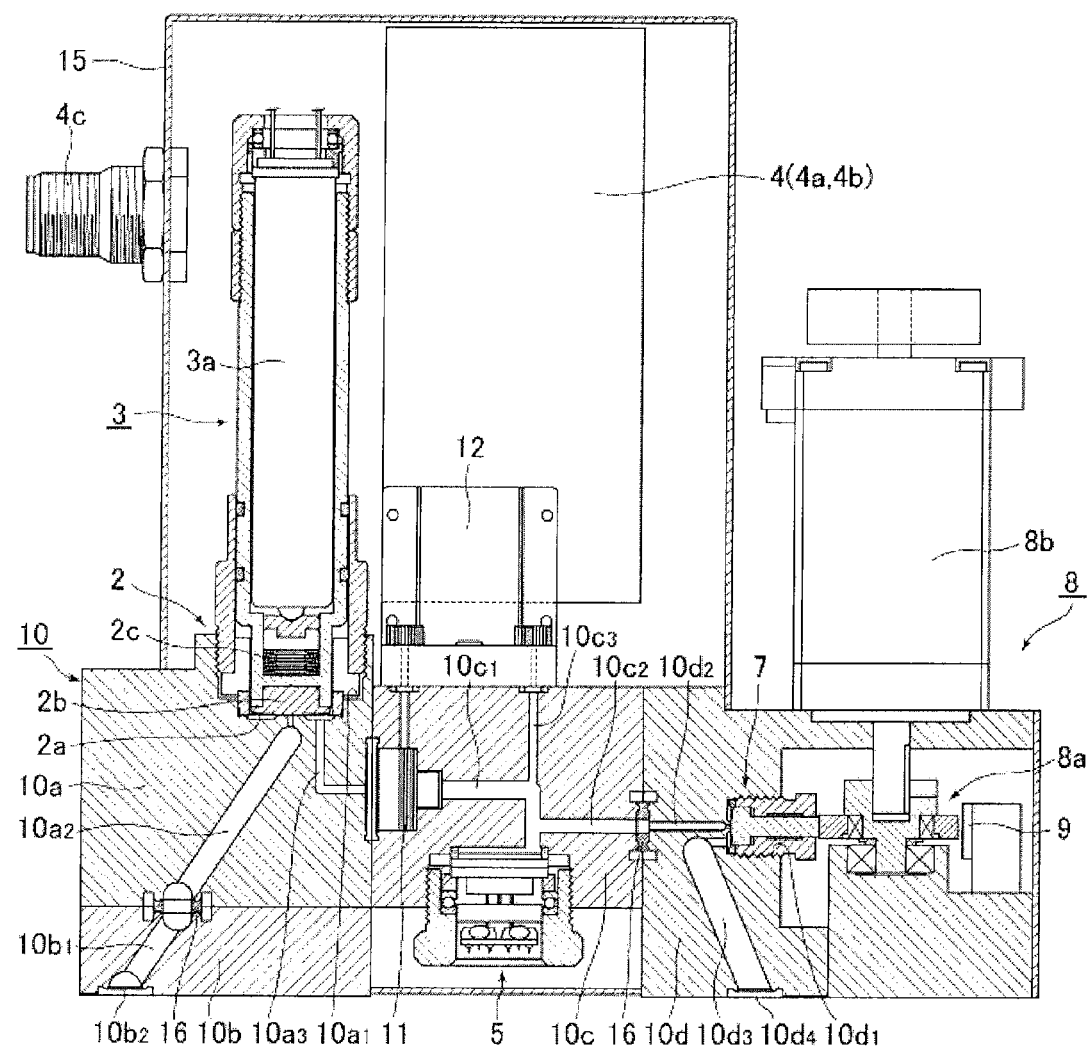
FIG. 2 is a longitudinal sectional view of the pressure-controlled flow controller according to the first preferred embodiment.
Figure 6:
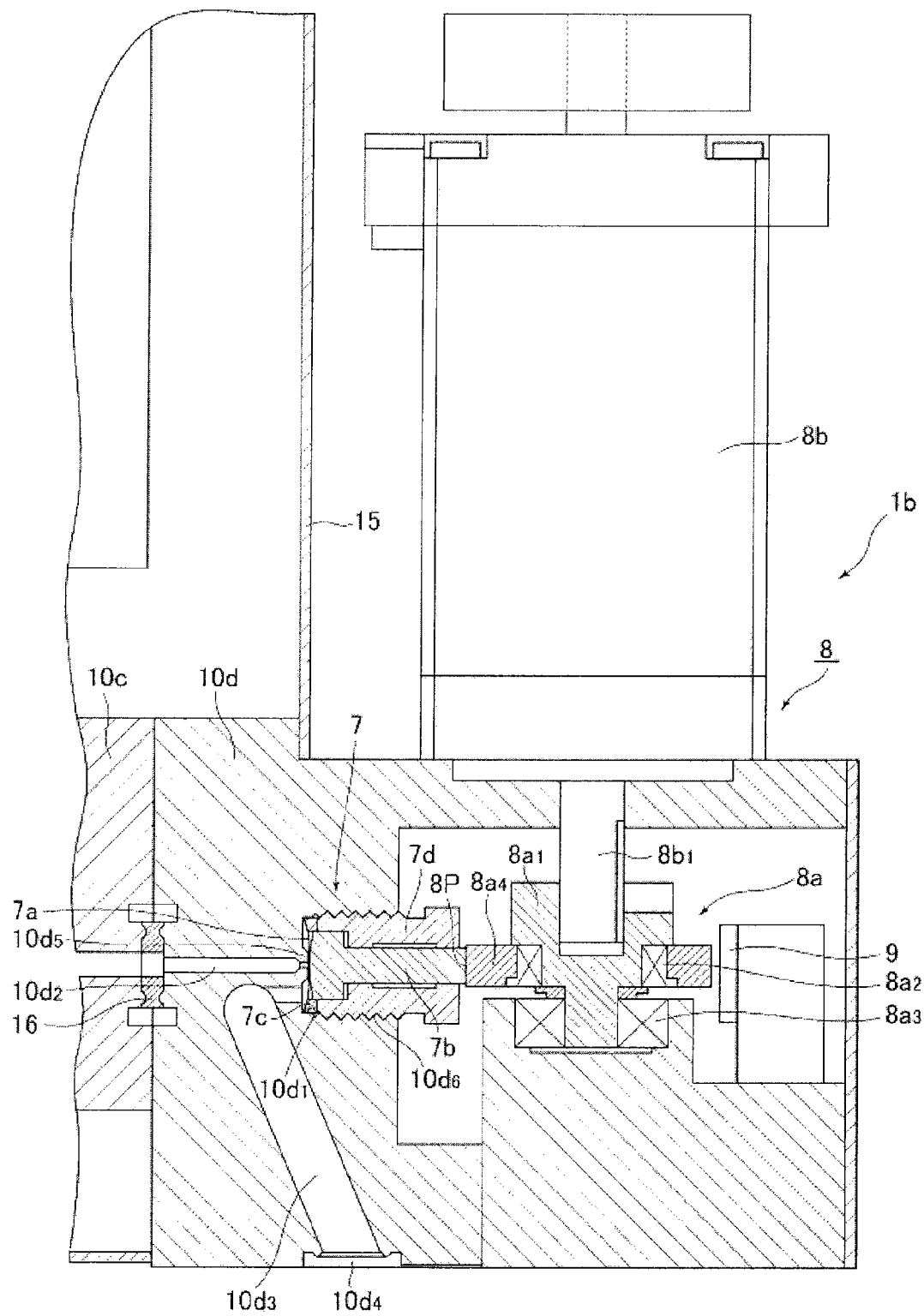
FIG. 6 is a partial enlarged view of FIG. 2.
Figure 12:
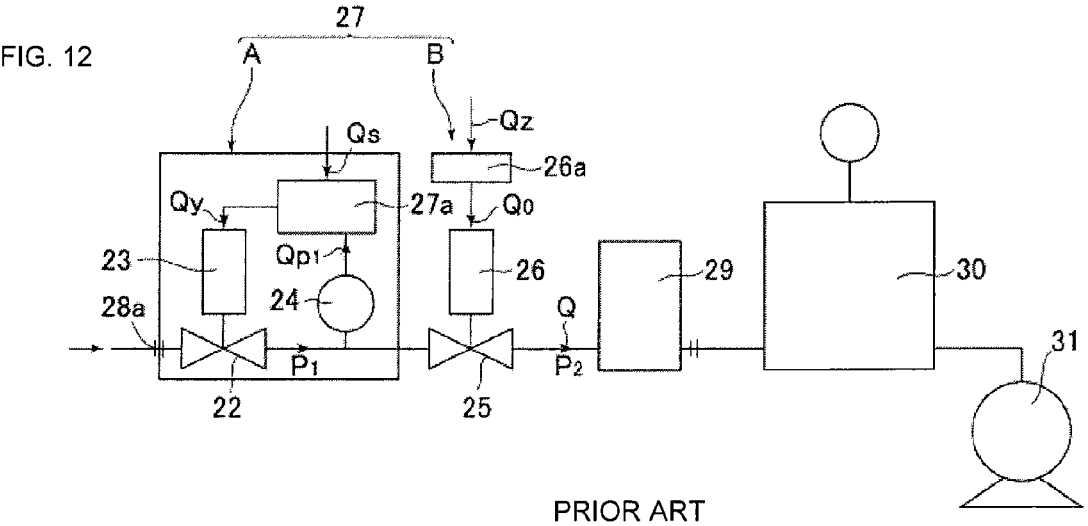
FIG. 12 is a systematic diagram of a conventional variable orifice type pressure-controlled flow controller.
Figure 13:
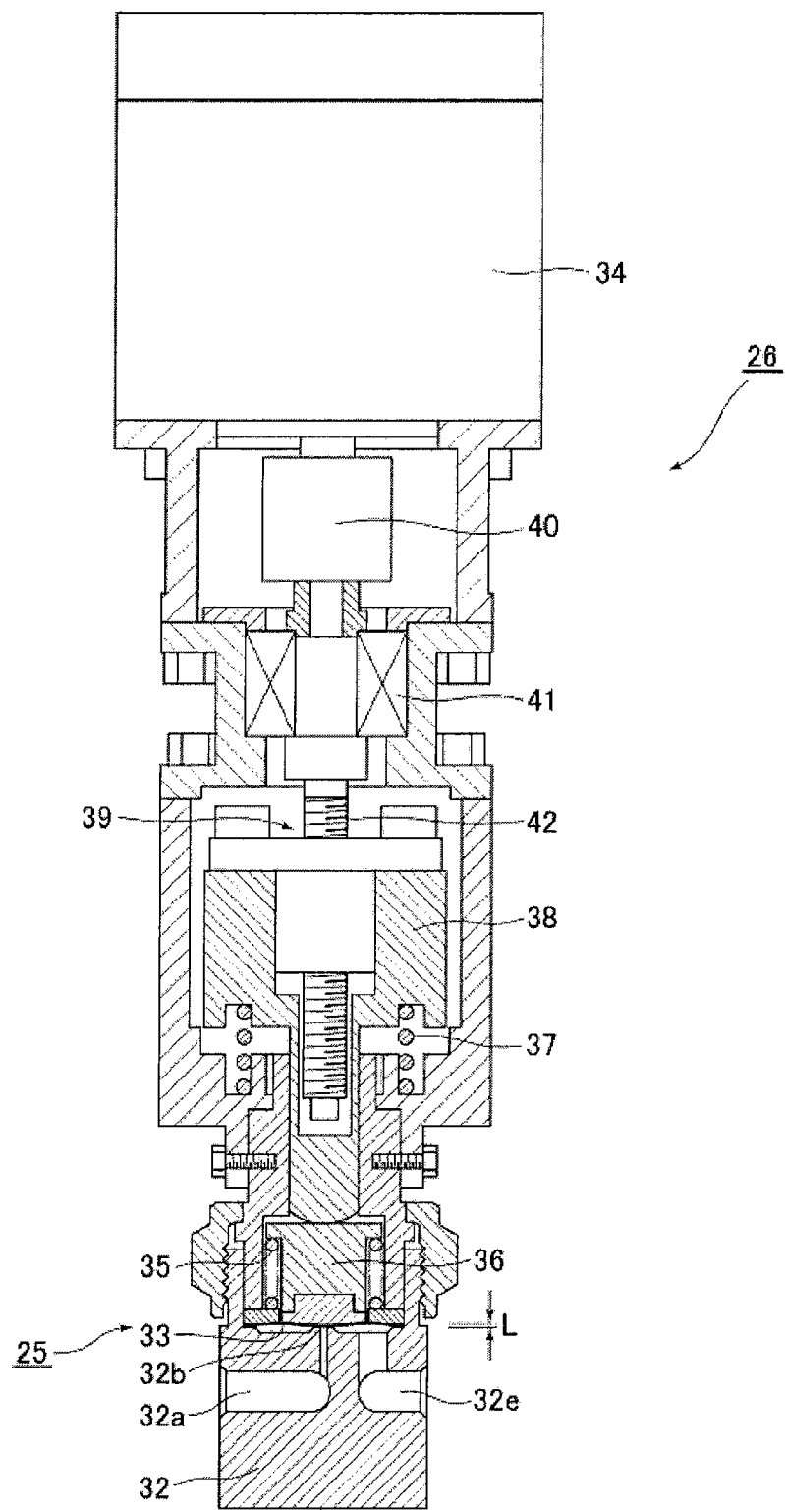
FIG. 13 is a general sectional view of a conventional variable orifice unit.

On the other hand, the variable orifice unit 1b uses a variable orifice (direct touch type metal diaphragm valve) 7 analogous to the conventional pressure control unit A shown in FIG. 12, however, the structures of the orifice drive unit 8 and the orifice opening degree arithmetic and control unit 4b forming the variable orifice unit 1b are greatly different from those of the conventional variable orifice unit B, and as shown in FIG. 2 and FIG. 6, the variable orifice 1b is formed by a novel orifice drive unit 8, an orifice opening degree arithmetic and control unit 4b, and a displacement sensor 9, etc.

The pressure control unit 1a computes a fluid flow rate $Q_{P1}$ distributed through the variable orifice 7 as $Q_{P1}=KP_1$ by using a pressure detection value $P_1$ detected by the pressure detector 5 and a temperature detection value $T_1$ detected by the temperature detector 6, and drives a control valve drive unit 3 by a difference signal (control signal) Qy between a set flow rate Qs and a detected flow rate $Q_{P1}$ to control the degree of opening of the pressure control valve 2, so that the difference signal (control signal) Qy becomes zero.

The variable orifice unit 1b is formed by an orifice opening degree arithmetic and control unit 4b into which an orifice opening degree setting signal Qz is input, a variable orifice drive unit 8 that drives the variable orifice 7 in response to an input of an orifice control signal Qo, a metal touch type diaphragm valve constituting the variable orifice 7, and a displacement sensor 9 that detects an actuation amount (displacement amount) of the variable orifice 7, etc. In the orifice opening degree arithmetic and control unit 4b, an opening degree detection signal (displacement amount signal) $Q_L$ of the variable orifice 7 detected by the displacement sensor 9 and the orifice opening degree setting signal Qz are compared. The degree of opening of the metal touch type diaphragm valve forming the variable orifice 7 (that is, the orifice hole diameter) is adjusted via the variable orifice drive unit 8 by the orifice control signal Qo, so that the difference between the opening degree detection signal (displacement amount signal) $Q_L$ and the orifice opening degree setting signal Qz becomes zero.

The constitution and operation of the pressure control unit 1a and the use of the metal touch type diaphragm valve as the variable orifice 7 of the variable orifice unit 1b are known from Patent Document 1 and Patent Document 2 listed above, therefore, detailed descriptions thereof are omitted.

In FIG. 1, the reference symbol 28a denotes a gas inlet, and 28b denotes a gas outlet.

Figure 3:
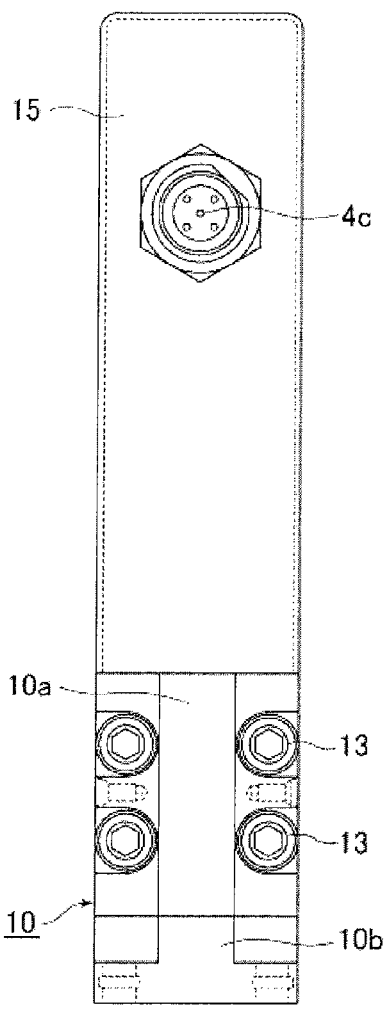
FIG. 3 is a left side view of FIG. 2.
Figure 4:
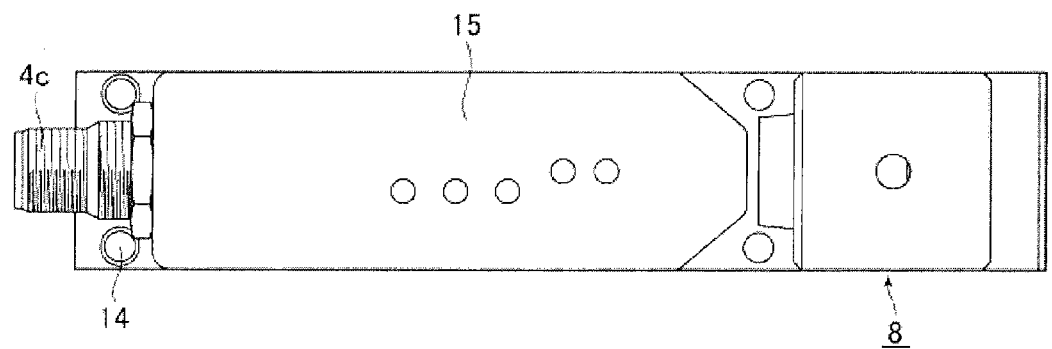
FIG. 4 is a plan view of FIG. 2.
Figure 5:
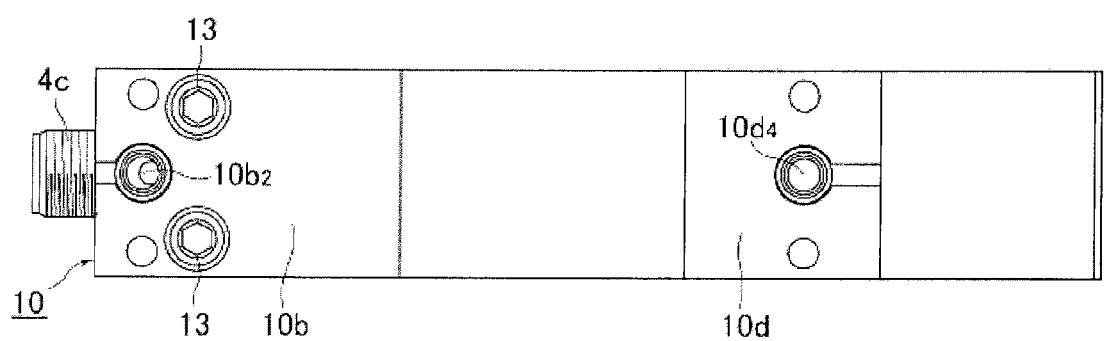
FIG. 5 is a bottom view of FIG. 2.

FIG. 2 is a longitudinal sectional general view of a pressure-controlled flow controller 1 according to a first preferred embodiment, and FIG. 3 is a left side view of the same, FIG. 4 is a plan view of the same, and FIG. 5 is a bottom view of the same. FIG. 6 is a partial enlarged view of the variable orifice unit 1b in FIG. 2.

In FIG. 2 to FIG. 6, the reference symbol 2a denotes a diaphragm constituting the pressure control valve 2, reference 2b denotes a diaphragm presser, reference 2c denotes a disc spring, reference 3a denotes a piezoelectric element forming the pressure control valve drive unit 3, reference 4 denotes a control unit forming a flow rate arithmetic and control unit 4a and an orifice opening degree arithmetic and control unit 4b, reference 4c denotes a connection port, reference 5 denotes a pressure detector, reference 6 denotes a temperature detector (not illustrated), reference 7 denotes a variable orifice (direct touch type metal diaphragm valve), reference 8a denotes an eccentric cam constituting the variable orifice drive unit 8, reference 8b denotes a stepping motor, reference 9 denotes a displacement sensor, reference 10 denotes a flow controller main body, reference 11 denotes a laminar flow element of a thermal type flow meter, reference 12 denotes a thermal type flow meter (mass flow meter), reference 13 denotes a connecting and fixing bolt, 14 denotes a bolt insertion hole, reference 15 denotes a casing, and reference 16 denotes a sealing member.

The flow controller main body 10 is formed by joining a quadratic prism-shaped first main body 10a, a quadratic prism-shaped second main body 10b, a quadratic prism-shaped third main body 10c, and a quadratic prism-shaped fourth main body 10d. Main bodies 10a, 10b, 10c, and 10d are mutually integrated by the connecting and fixing bolts 13. On the upper surface side of the first main body 10a, are formed a recess portion $10a_1$ into which components of the pressure control valve 2 are inserted and fixed, and a fluid passage $10a_2$ and a fluid passage $10a_3$.

The second main body 10b is fixed to the back surface side of the first main body by sandwiching the sealing member 16. Fluid passages $10b_1$ and $10a_2$ are joined airtight. The reference symbol $10b_2$ denotes a fluid flow inlet.

Further, the third main body 10c is fixed airtight to the right side surface of the first main body by the connecting bolts 13 via the laminar flow element 11, and to the upper surface side of the third main body, the thermal type flow meter 12 is attached and fixed, and to the lower surface side, the pressure detector 5 is attached and fixed. The reference symbols $10C_1$, $10C_2$, and $10C_3$ denote fluid passages.

The fourth main body 10d is fixed airtight to the right side surface of the third main body 10c by the connecting bolts (not illustrated) via the sealing member 16, and to the upper surface side of the fourth main body, the stepping motor 8b forming the variable orifice drive unit 8 described later is fixed, and to the right side of the fourth main body 10d, a space portion that accommodates a cam mechanism including the eccentric cam 8a, etc., is formed. Furthermore, on the right side surface of the fourth main body 10d, a recess portion $10d_1$ is provided for accommodating a direct touch type metal diaphragm valve forming the variable orifice 7. The reference symbols $10d_2$ and $10d_3$ denote fluid passages, and $10d_4$ denotes a fluid flow outlet.

The assembling structure of the flow controller main body 10, the pressure control valve 2, the pressure control valve drive unit 3, the flow rate arithmetic and control unit 4a of the control unit 4, the pressure detector 5, the temperature detector 6, the direct touch type metal diaphragm valve forming the variable orifice 7, the stepping motor 8b of the variable orifice drive unit 8, and the displacement sensor 9, etc., are known, therefore detailed description thereof is omitted here.

FIG. 6 is an enlarged longitudinal sectional view of a mechanical portion of the variable orifice unit 1b being an essential portion of the present invention, and the variable orifice unit 1b is formed by the variable orifice 7 and the variable orifice drive unit 8.

The variable orifice 7 includes a planar valve seat $10d_5$ formed on the bottom surface of the recess portion $10d_1$ provided on the right side surface of the fourth main body 10d, a metal diaphragm 7a disposed to face the valve seat, a diaphragm presser 7b that presses the diaphragm, a gasket 7c that presses the outer peripheral edge portion of the metal diaphragm 7a, and a pressing body 7d that is screwed and fixed into the recess portion $10d_1$ and holds the diaphragm presser 7b movably in the left-right direction, and presses the gasket 7c by the tip end portion, etc., and has a structure similar to that of a conventional so-called direct touch type metal diaphragm valve.

In more detail, the valve seat $10d_5$ is formed to have a flat seat shape, and the hole diameter of the tip end portion of the fluid passage $10d_2$ (that is, the hole diameter of the valve seat $10d_5$) is selected to be 0.1 to 1.0 mm, and the length is selected to be 1 to 3 mm.

The outer diameter of the diaphragm 7a is selected to be 8 mmφ so that the diaphragm is hardly influenced by a fluid inner pressure.

Furthermore, the distance between the valve seat $10d_5$ and the diaphragm 7a (that is, the clearance of the orifice hole) is set to 0.001 to 0.3 mm by selecting the angle allocation of the stepping motor 8b and the eccentric cam 8a, and accordingly, the $C_V$ value of the variable orifice is set.

The variable orifice drive unit 8 includes the eccentric cam 8a and the stepping motor 8b, and the eccentric cam 8a is formed of, as shown in FIG. 6, a columnar rotary shaft body $8a_1$ having three outer diameters of a large-diameter portion, a medium-diameter portion, and a small-diameter portion, a first bearing $8a_2$ fitted to the medium-diameter portion outer peripheral surface of the rotary shaft body $8a_1$, a second bearing $8a_3$ fitted to the small-diameter portion outer peripheral surface of the rotary shaft body $8a$, and a cam plate $8a_4$ fitted to the outer peripheral surface of the first bearing $8a_2$, etc., and the rotary shaft body $8a_1$ is supported and fixed rotatably by a motor shaft $8b_1$ inserted and fixed vertically to a position eccentric by a predetermined amount from the axis center of the rotary shaft body $8a_1$.

That is, according to turning of the motor shaft $8b_1$, the rotary shaft body $8a_1$ turns. However, the first bearing $8a_2$ is interposed, so that the cam plate $8a_4$, fitted to the outer ring side of the first bearing is held in a freely rotatable state, and as a result, the contact portion 8P between the outer peripheral surface of the cam plate $8a_4$ and the outer end face of the diaphragm presser 7b is held in a state where these surfaces do not move while being in contact with each other (slide with each other). At this time, the diaphragm presser 7b is always pressed toward the cam plate $8a_4$ by the elastic force of the inverted dish-shaped diaphragm 7a.

The motor shaft $8b_1$ is fixed to the rotary shaft body $8a_1$ so as to become eccentric by a predetermined amount from the axis center of the rotary shaft body $8a_1$, and in the present preferred embodiment, the distance of eccentricity is selected to be 0.2 mm, and the outer diameter of the cam plate $8a_4$ is selected to be 20 mm$\phi$, respectively.

As a result, according to turning of the motor shaft $8b_1$, the contact portion 8P of the outer peripheral surface of the cam plate $8a_4$ moves in the left-right direction of FIG. 6 via the first bearing $8a_2$, and for example, when the contact portion 8P of the outer peripheral surface moves rightward, due to the elastic force of the diaphragm 7a, the diaphragm presser 7b moves rightward by following the movement of the contact portion 8P, and the valve opening degree becomes large.

For the stepping motor 8b, an outer diameter of 28 mm, a torque of 0.11 N/m, a turning speed of 200 degrees/0.2 sec are used, and in the present preferred embodiment, a displacement of 400 μm could be obtained per a rotation angle of 180 degrees of the eccentric cam 8a, and positioning of 400 μm/1600 is performed in 1/16 microstep driving.

The displacement sensor 9 provided to face the cam plate $8a_4$ detects the displacement amount $Q_L$ of the cam plate $8a_4$, and inputs the displacement amount detection signal $Q_L$ into the orifice opening degree arithmetic and control unit 4b to perform feedback control of the orifice control signal Qo to the variable orifice drive unit 8a, and accordingly, adjustment of the opening degree of the variable orifice 7 (that is, positional adjustment of the contact portion 8P) is performed.

Furthermore, the $C_V$ value characteristics of the variable orifice 7 may be changed by the temperature, so that it is desirable that so-called temperature correction is performed during the orifice opening degree adjustment.

Figure 7:
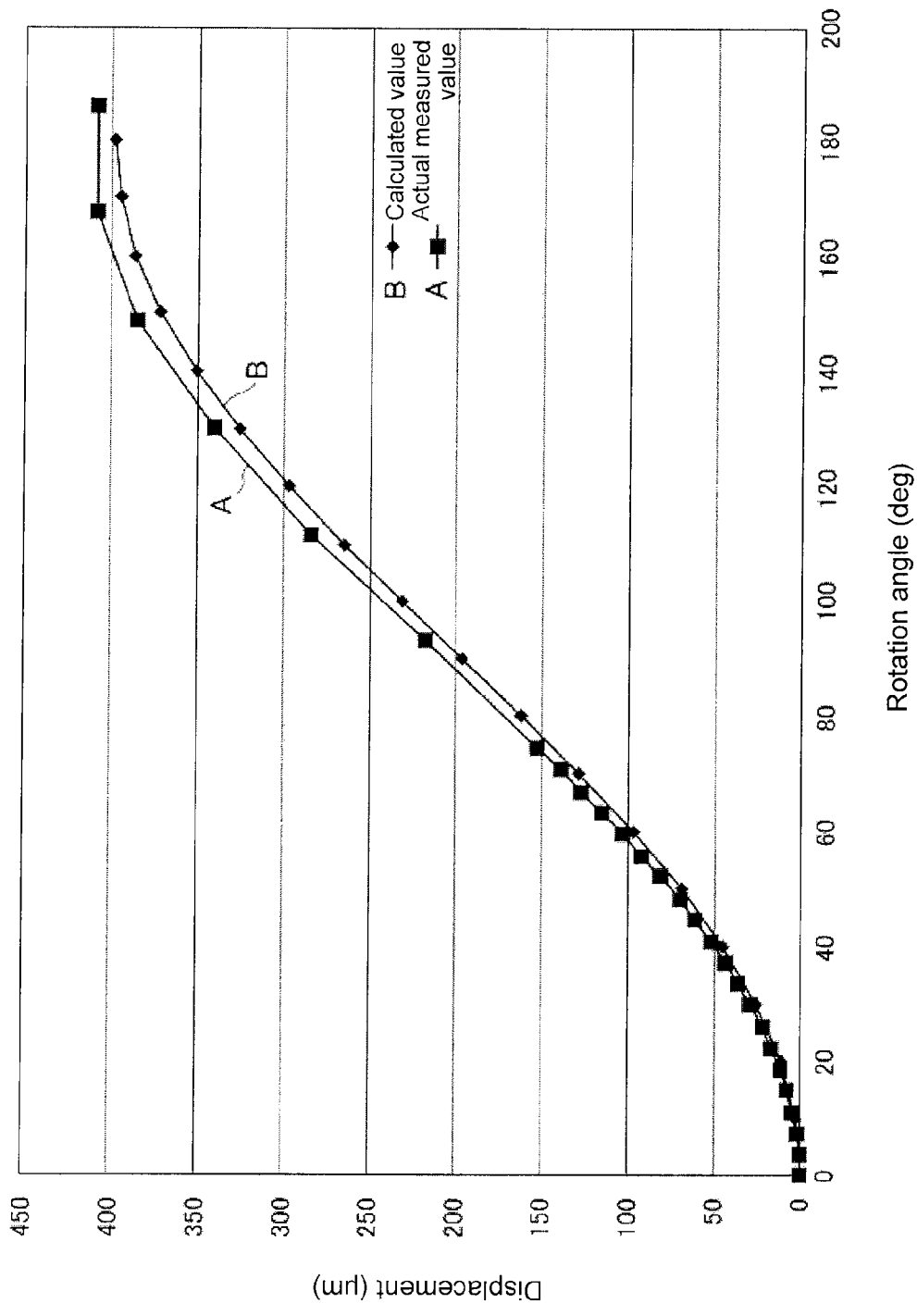
FIG. 7 is a characteristic curve showing a relationship between a turning angle of a cam plate and a cam plate displacement.

FIG. 7 shows the relationship between the rotation angle of the cam plate $8a_4$ and the displacement amount of the cam plate $8a_4$ in the preferred embodiment shown in FIG. 6, and the curve A shows actual measured values, and the curve B shows calculated values.

The measurement was performed by setting the outer diameter of the cam plate $8a_4$ to 20 mm and the amount of eccentricity to 0.2 mm, and it could be confirmed that the displacement amounts (μm) and the actual measured values A of the rotation angle were close to the calculated values B.

Figure 8:
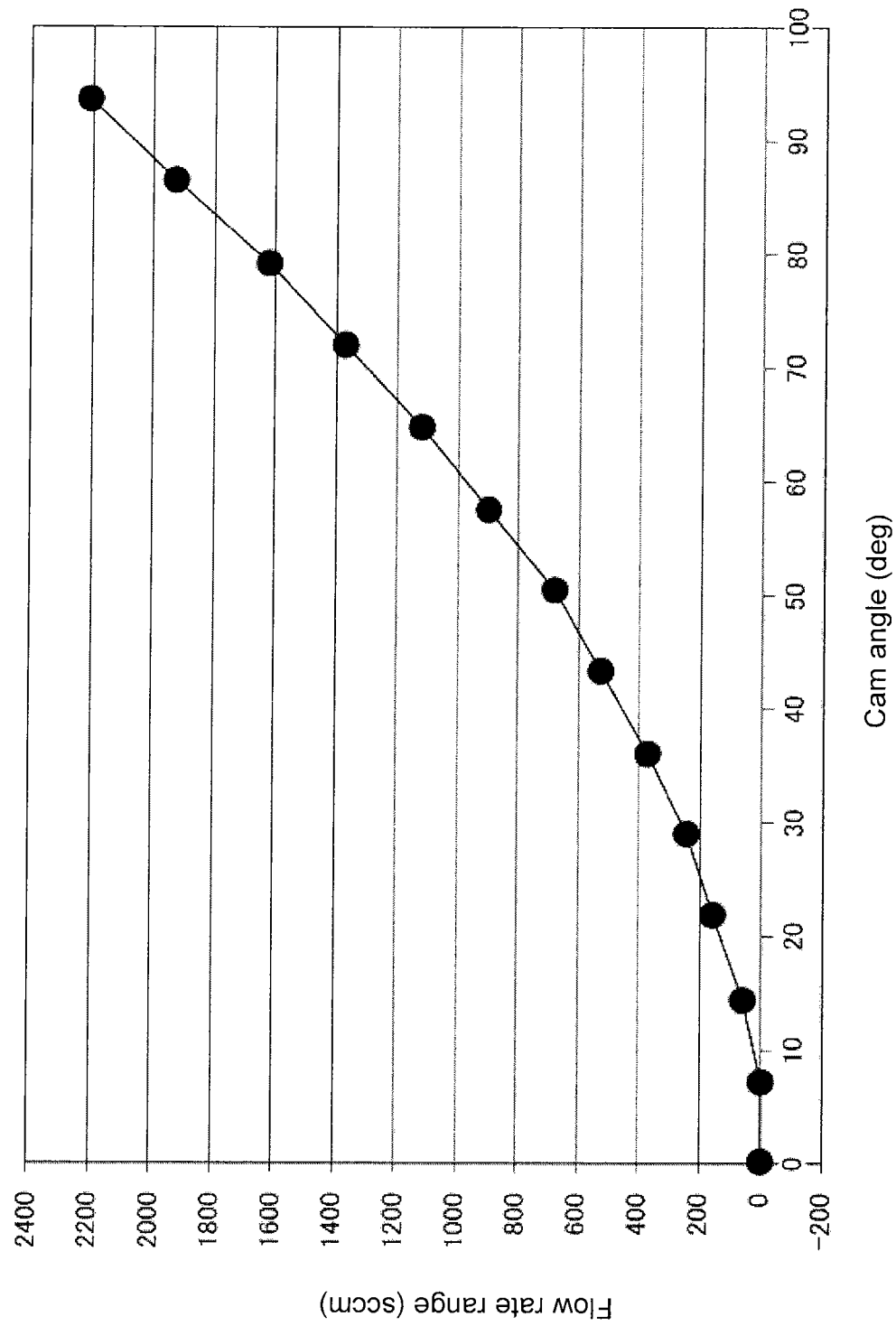
FIG. 8 is a characteristic curve showing a relationship between a turning angle of the cam plate and a flow rate range (sccm).

FIG. 8 shows the relationship between the rotation angle of the cam plate $8a_4$ and the flow rate range (sccm) in the preferred embodiment shown in FIG. 6, and the measurement was performed by setting the outer diameter of the cam plate $8a_4$ to 20 mm, the amount of eccentricity to 0.2 mm, the outer diameter of the diaphragm 7a to 8 mm$\phi$, the hole diameter of the valve seat $10d_5$ to 0.3 mm$\phi$, and the hole length to 2.5 mm.

TABLE 1

| Angle | Displacement (μm) | Area | Equivalent hole diameter | Flow rate range | Range ratio | $C_V$ |
|---|---|---|---|---|---|---|
| 0 | 0 | 0.0000 | 0 | 0 | — | 0 |
| 7.2 | 0 | 0.0000 | 0 | 0 | — | 0 |
| 14.4 | 2 | 0.0019 | 49 | 62 | 35.5 | 9.97412E−05 |
| 21.6 | 5 | 0.0047 | 77 | 156 | 14.2 | 0.000249353 |
| 28.8 | 8 | 0.0075 | 98 | 249 | 8.9 | 0.000398965 |
| 36 | 12 | 0.0113 | 120 | 374 | 5.9 | 0.000598447 |
| 43.2 | 17 | 0.0160 | 143 | 529 | 4.2 | 0.0008478 |
| 50.4 | 22 | 0.0207 | 162 | 685 | 3.2 | 0.001097153 |
| 57.6 | 29 | 0.0273 | 187 | 903 | 2.4 | 0.001446247 |
| 64.8 | 36 | 0.0339 | 208 | 1121 | 2.0 | 0.001795341 |
| 72 | 44 | 0.0414 | 230 | 1370 | 1.6 | 0.002194306 |
| 79.2 | 52 | 0.0490 | 250 | 1619 | 1.4 | 0.002593271 |
| 86.4 | 62 | 0.0584 | 273 | 1930 | 1.1 | 0.003091976 |
| 93.6 | 71 | 0.0669 | 292 | 2210 | 1.0 | 0.003540812 |

Table 1 shows measured values or calculated values of the rotation angle of the cam plate $8a_4$, the displacement amount (μm) of the cam plate $8a_4$, the clearance opening area (μm$^2$), the equivalent hole diameter (μm) to the clearance opening area, the flow rate range (sccm), the range ratio to the maximum flow rate range, and the $C_V$ value in the case where the hole diameter of the valve seat $10d_5$ of the variable orifice 7 is set to 0.3 mm$\phi$, and the variable range of the flow rate range is the range of 35:1 (MIN 62 sccm).

TABLE 2

| Angle | Displacement (μm) | Area | Equivalent hole diameter | Flow rate range | Range ratio | $C_V$ |
|---|---|---|---|---|---|---|
| 0 | 0 | 0.0000 | 0 | 0 | — | 0 |
| 7.2 | 0 | 0.0000 | 0 | 0 | — | 0 |
| 14.4 | 0.5 | 0.0002 | 14 | 5 | 46.5 | 8.31176E−06 |
| 21.6 | 1.25 | 0.0004 | 22 | 13 | 18.6 | 2.07794E−05 |
| 28.8 | 2 | 0.0006 | 28 | 21 | 11.6 | 3.32471E−05 |
| 36 | 3 | 0.0009 | 35 | 31 | 7.7 | 4.98706E−05 |
| 43.2 | 4.25 | 0.0013 | 41 | 44 | 5.5 | 0.00007065 |
| 50.4 | 5.5 | 0.0017 | 47 | 57 | 4.2 | 9.14294E−05 |
| 57.6 | 7.25 | 0.0023 | 54 | 75 | 3.2 | 0.000120521 |
| 64.8 | 9 | 0.0028 | 60 | 93 | 2.6 | 0.000149612 |
| 72 | 11 | 0.0035 | 66 | 114 | 2.1 | 0.000182859 |
| 79.2 | 13 | 0.0041 | 72 | 135 | 1.8 | 0.000216106 |
| 86.4 | 15.5 | 0.0049 | 79 | 161 | 1.5 | 0.000257665 |
| 93.6 | 17.75 | 0.0056 | 84 | 184 | 1.3 | 0.000295068 |
| 100.8 | 20.25 | 0.0064 | 90 | 210 | 1.1 | 0.000336626 |
| 108 | 23.25 | 0.0073 | 96 | 241 | 1.0 | 0.000386497 |

Similarly, Table 2 shows the respective measured values or calculated values of the same rotation angle, etc., as in Table 1 in the case where the hole diameter of the valve seat $10d_5$ of the variable orifice 7 is set to 0.1 mm$\phi$, and the variable range of the flow rate range is the range of 48:1 (MIN 5 sccm).

As the conventional pressure-controlled flow controller using a fixed orifice, at present, approximately 50 kinds of pressure type flow controllers with different flow control ranges of types F10 (full scale flow rate: 10 sccm) to F10L (full scale flow rate: 10 slm) are manufactured and marketed, and various problems exist in manufacturing and management of various kinds of orifices.

On the other hand, in the case of using the variable orifice 7 according to the present invention, by only preparing three kinds of variable orifices with valve seats $10d_5$ the opening hole diameters of which are 0.5 mmϕ, 0.3 mmϕ, and 0.1 mmϕ, the flow rate ranges of 1 to 10 slm (for a high flow rate, valve seat hole diameter: 0.5 mmϕ), 65 to 2000 sccm (for a medium flow rate, valve seat hole diameter: 0.3 mmϕ), and 10 to 240 sccm (for a small flow rate, valve seat hole diameter: 0.1 mmϕ) can be covered, and approximately 50 kinds of conventional pressure-controlled flow controllers using fixed orifices can be covered by the pressure-controlled flow controller 1 according to the present invention using three kinds of variable orifices 7.

As described above, the turning speed of the stepping motor $8b$ is 200 degrees/0.2 sec, and therefore, a time required to turn the cam plate $8a_4$ by 80 to 100 degrees is as short as approximately 0.1 seconds. Therefore, for example, in the first preferred embodiment, adjusting and switching of the clearance of the variable orifice 7 from the clearance for 100% flow rate setting (240 sccm, valve seat hole diameter of the variable orifice 7: 0.1 mm) to the clearance for 20% flow rate setting (10 sccm) can be completed in a short time of 0.1 seconds or less.

However, at the time of switching to a flow rate of 2 sccm (20% flow rate) in the flow rate range in which the fluid flow rate is up to 10 sccm (100% flow rate), that is, at the time of flow rate switching in a small flow rate region, a required lowering time t is greatly influenced by a time to be taken to remove the gas from the inside of the upstream side flow passage of the variable orifice 7 (that is, the fluid flow passage between the pressure control valve 2 and the variable orifice 7), and as shown in FIG. 14, it takes a time of about 6 to 7 seconds to remove the gas from the inside of the upstream side flow passage.

Figure 9:
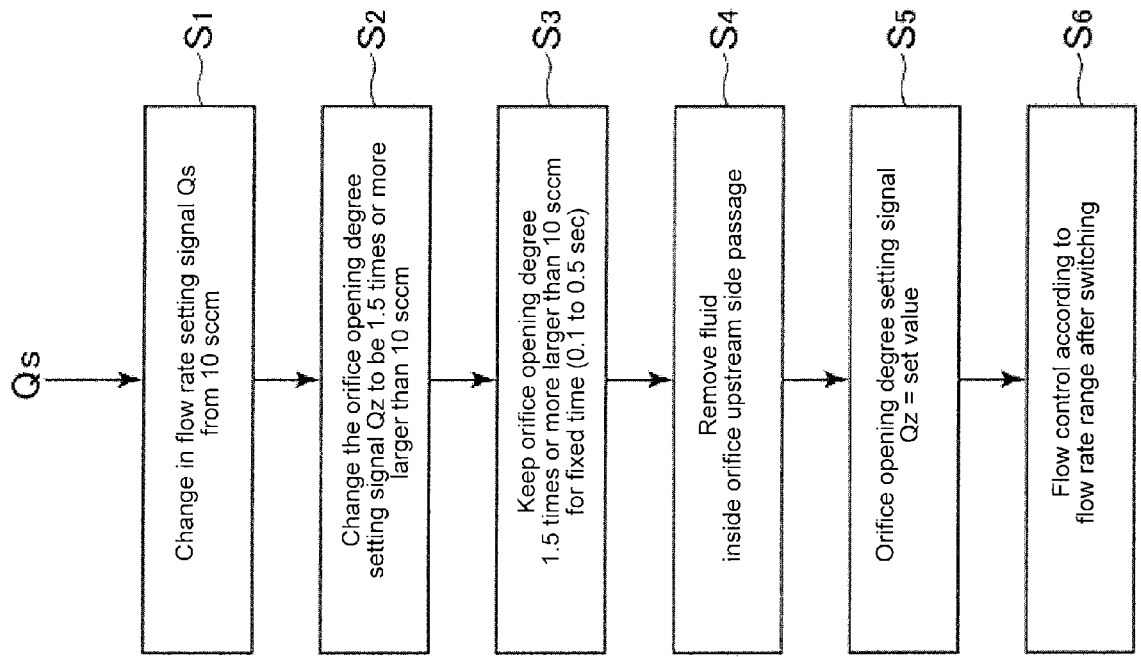
FIG. 9 is an operation explanatory view of a variable orifice 7 when the flow rate range is switched in a small flow rate region.
Figure 9:
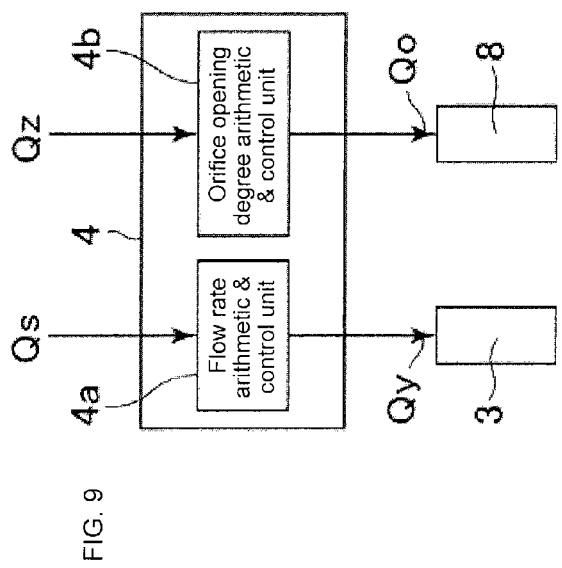

Therefore, in the present embodiment, as shown in FIG. 9, when the input of the flow rate setting signal Qs into the flow rate arithmetic and control unit $4a$ changes (for example, changes from 10 sccm to 2 sccm), the change in the flow rate setting signal Qs is detected first (Step $S_1$), and accordingly, the orifice opening degree setting signal Qz is increased to 1.5 times or more to increase the opening degree of the variable orifice 7 to 1.5 times or more (Step $S_2$).

Next, for a fixed time (for example, 0.1 to 0.5 seconds), the orifice opening degree is kept in a state of 1.5 times or more (Step $S_3$), and during this time, the gas inside the orifice upstream side passage is removed to the outside through the clearance of the variable orifice 7 and the valve seat $10d_5$ (hole diameter: 0.1 mm) (Step $S_4$).

Thereafter, the orifice opening degree setting signal Qz is returned to the set value for the 100% set flow rate (10 sccm) (Step $S_5$), and flow control is performed by the pressure-controlled flow controller 1 switched for 20% set flow rate (2 sccm).

In FIG. 9, the opening degree of the variable orifice 7 is increased to 1.5 times or more in Step $S_2$, and the variable orifice 7 is opened at a time to remove the gas inside the upstream side passage, however, as a matter of course, when there is a possibility that equipment and devices, etc., and treatment processes on the downstream side of the variable orifice 7 are damaged, an upper limit (for example, 10 times larger than the degree of opening before the change) has to be set for the change in the degree of opening of the variable orifice 7.

Figure 10:
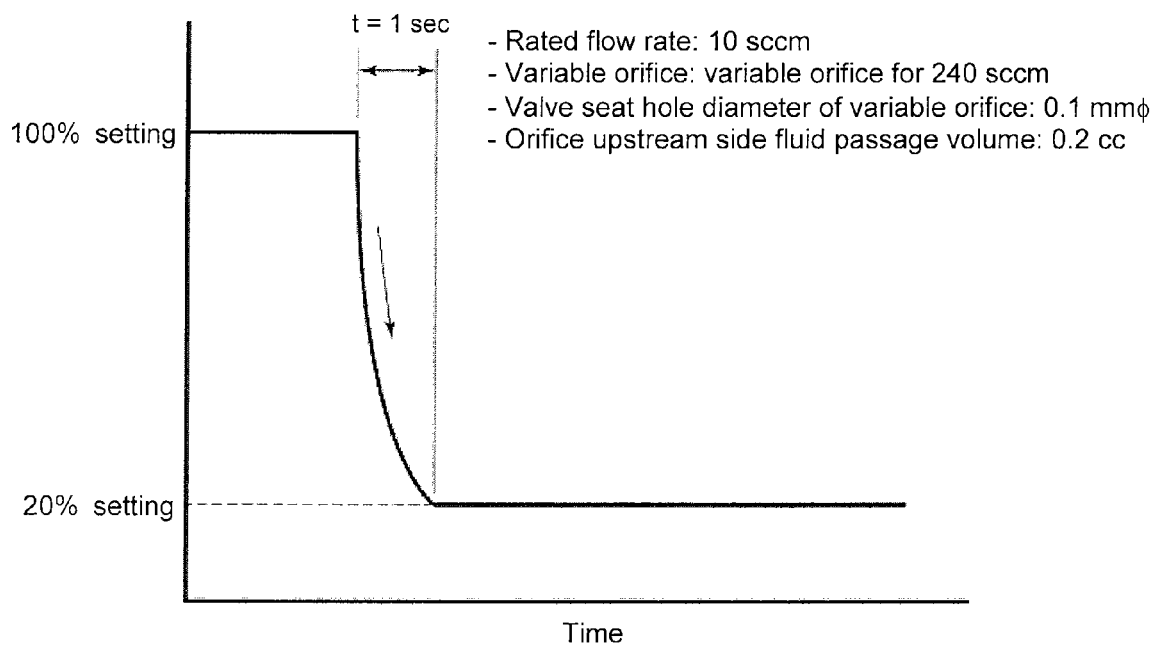
FIG. 10 is a diagrammatic drawing showing lowering characteristics at the time of flow control from the 100% set flow rate (100 sccm) to the 20% set flow rate (2 sccm) when the set flow rate is switched to 10 sccm in a pressure-controlled flow controller for a small flow rate (maximum set flow rate: 240 sccm, valve seat hole diameter of variable orifice 7: 0.1 mmϕ) according to an preferred embodiment of the present invention.

FIG. 10 shows flow rate lowering characteristics when the flow rate is switched to a predetermined 20% flow rate of 2 sccm during flow control at the 100% set flow rate of 100 sccm by using the variable orifice 7 in the case where the flow rate through the variable orifice 7 in the first preferred embodiment is 240 sccm at a maximum (hole diameter of the valve seat $10d_5$: 0.1 mmϕ) based on the operation of the variable orifice 7 shown in FIG. 9, and it is found that flow rate switching from 10 sccm to 2 sccm can be performed in a lowering time t of approximately 1 second.

The flow rate lowering time t=1 second in FIG. 9 includes the time from Step $S_1$ to Step $S_6$ shown in FIG. 9, however, the time required to switch the variable orifice 7 itself (adjust the clearance between the upper surface of the valve seat $10d_5$ and the diaphragm $7a$) is within 0.1 to 0.2 seconds, and therefore, most of the flow rate lowering time t is a time required for Step $S_4$.

Figure 11:
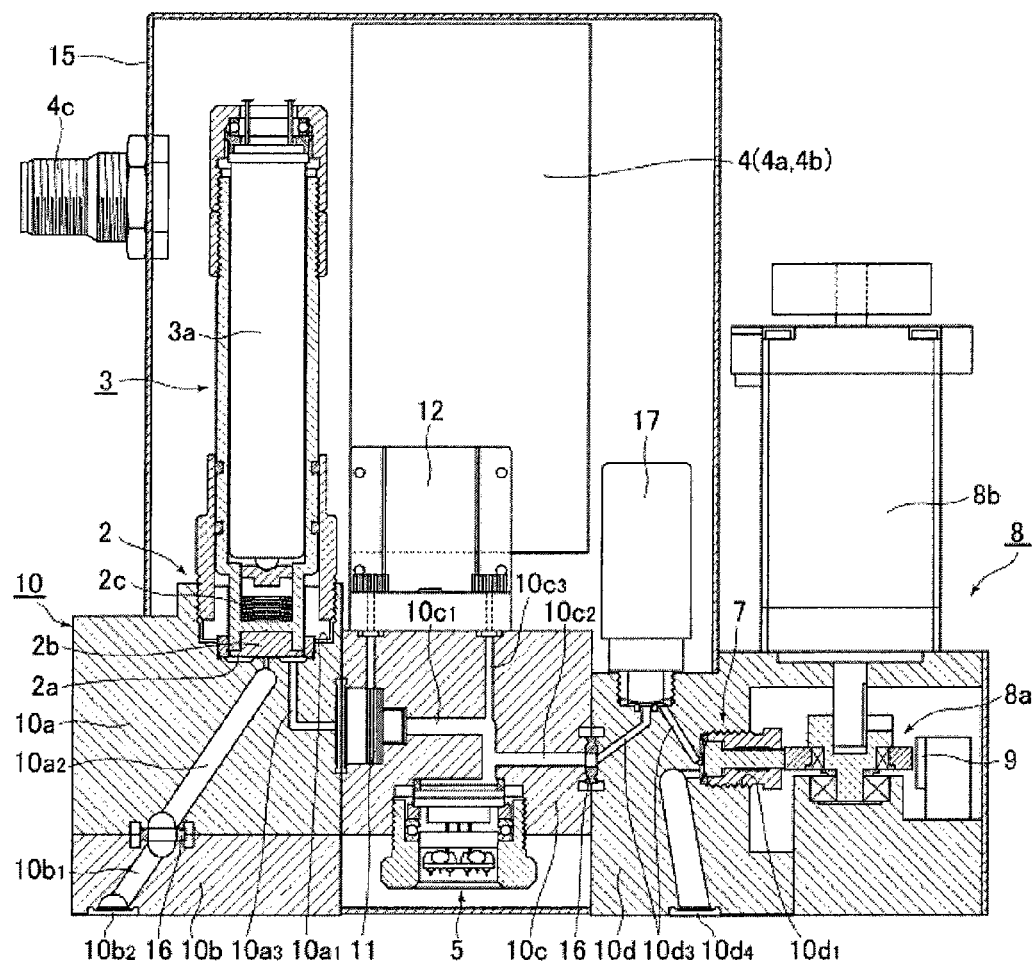
FIG. 11 is a longitudinal sectional view of a pressure-controlled flow controller according to a second preferred embodiment of the present invention.

FIG. 11 is a longitudinal sectional view of a variable orifice type pressure-controlled flow controller according to a second preferred embodiment of the present invention, in which a shut-off valve 17 is provided on the inner upper surface side of the fourth main body $10d$ so that the fluid passage $10d_3$ can be shut-off in emergency situations.

As the shut-off valve 17, a direct touch metal diaphragm valve having the same structure as that of the air-actuated type pressure control valve 2 is used, and this is actuated in emergency situations, etc., to close the fluid passage $10d_3$ and shut-off supply of the gas.

The variable orifice type pressure-controlled flow controller according to the second preferred embodiment is the same as that according to the first preferred embodiment except that the shut-off valve 17 is provided, and therefore, detailed description thereof is omitted.

The present invention is applicable not only to gas flow controllers for semiconductor manufacturing equipment but also to fluid flow controllers in chemical goods production equipment, food-related manufacturing equipment, and various test equipment, etc.

DESCRIPTION OF REFERENCE SYMBOLS

Qs: set flow rate signal
$Q_{P1}$: computed flow rate signal
Qy: control signal (difference signal)
Qz: orifice opening degree setting signal
Qo: orifice control signal
$Q_L$: orifice opening degree detection signal
t: lowering time
1: variable orifice type pressure-controlled flow controller
$1a$: pressure control unit
$1b$: variable orifice unit
2: pressure control valve
$2a$: diaphragm
$2b$: diaphragm presser
3: pressure control valve drive unit
$3a$: piezoelectric element
4: control unit
$4a$: flow rate arithmetic and control unit
$4b$: orifice opening degree arithmetic and control unit
$4c$: connection port
5: pressure detector
6: temperature detector
7: variable orifice (direct touch type metal diaphragm valve)
$7a$: diaphragm
$7b$: diaphragm presser
$7c$: gasket
$7d$: pressing metal fixture
8: variable orifice drive unit
$8a$: eccentric cam
$8a_1$: rotary shaft body 8a₂: first bearing
8a₃: second bearing
8a₄: cam plate
8P: contact point
8b: stepping motor
8b₁: motor shaft
9: displacement sensor
10: flow controller main body
10a: first main body
10a₁: recess portion
10a₂: fluid passage
10a₃: fluid passage
10b: second main body
10b₁, 10b₂: fluid passage
10c: third main body
10c₁, 10c₂, 10c₃: fluid passage
10d: fourth main body
10d₁: recess portion
10d₂, 10d₃: fluid passage
10d₄: fluid flow outlet
10d₅: valve seat
10d₆: screw
11: laminar flow element
12: thermal type flow meter (mass flow meter)
13: connecting and fixing bolt
14: bolt insertion hole
15: casing
16: sealing member
17: shut-off valve
28a: gas inlet
28b: gas outlet

The invention claimed is:

1. A variable orifice type pressure-controlled flow controller, comprising:
    a pressure control unit; and
    a variable orifice unit including,
        a direct touch type metal diaphragm valve having a valve seat and a diaphragm,
        an orifice formed of a ring-shaped clearance between the valve seat of the direct touch type metal diaphragm valve and the diaphragm,
        an orifice opening degree arithmetic and control unit,
        a stepping motor operably connected to be driven in response to an orifice control signal from the orifice opening degree arithmetic and control unit,
        an eccentric cam operably connected to be turned by the stepping motor,
        a diaphragm presser, and
        a direct touch type metal diaphragm valve having a valve opening degree arranged to be controlled by the eccentric cam via the diaphragm presser;
    wherein the variable orifice type pressure-controlled flow controller is arranged to
        compute a flow rate of a fluid distributed through the orifice of the variable orifice unit according to the formula $Q_{P1}=KP1$ (wherein P1 is an orifice upstream side pressure and K is a constant), and
        switch a flow control range, and
        perform flow control in a predetermined flow control range by changing a set flow rate signal $Q_S$ for the flow rate arithmetic and control unit of the pressure control unit and an orifice opening degree setting signal $Q_Z$ for an orifice opening degree arithmetic and control unit of the variable orifice unit,
    wherein the eccentric cam of the variable orifice unit further includes
        a rotary shaft body to which a motor shaft is fixed vertically so that the motor shaft is eccentric by a predetermined distance from a center of the rotary shaft body,
        a first bearing fixed to the outer peripheral surface of the rotary shaft body,
        a flange-shaped cam plate fixed to the outer peripheral surface of the first bearing, and
    wherein the cam plate is movable by the predetermined distance in the left-right direction in a non-rotating state by turning the rotary shaft body.

2. The variable orifice type pressure-controlled flow controller according to claim 1, further comprising a flow controller main body, wherein the direct touch type metal diaphragm valve forming the variable orifice unit further includes:
    a recess portion having a planar bottom surface formed by drilling on a side surface of the flow controller main body,
    a valve seat having a desired passage hole diameter formed on the bottom surface of the recess portion,
    an inverted dish-shaped diaphragm disposed to face the valve seat,
    a diaphragm presser disposed to face the diaphragm and having an outer end portion brought into contact with an outer peripheral surface of the cam plate, and
    a pressing metal fixture screwed and fixed into the recess portion, disposed to hold the diaphragm presser movably in a left-right direction, and press and fix the outer peripheral edge of the diaphragm.

3. The variable orifice type pressure-controlled flow controller according to claim 1, further comprising: a contact portion between the outer peripheral surface of the cam plate and the outer end portion of the diaphragm presser displaceable only in a left-right direction when the eccentric cam turns.

4. The variable orifice type pressure-controlled flow controller according to claim 1, wherein a turning angle of the stepping motor is set to 0 to 200 degrees, and in the turning angle range, the diaphragm presser is displaceable by a fixed distance in the left-right direction by the eccentric cam.

5. The variable orifice type pressure-controlled flow controller according to claim 1, further comprising a displacement sensor provided at a position axisymmetric to the contact portion between the outer peripheral surface of the cam plate of the eccentric cam and the outer end portion of the diaphragm presser to detect a displacement amount in the horizontal direction of the contact portion according to turning of the cam plate, wherein the displacement sensor is operable connected to inputs a detected orifice opening degree signal into the orifice opening degree arithmetic and control unit.

6. The variable orifice type pressure-controlled flow controller according to claim 1, wherein a shut-off valve is disposed in the upstream side passage of the variable orifice of the variable orifice unit.

7. A variable orifice type pressure-controlled flow controller, comprising:
    a pressure control unit;
    a variable orifice unit including,
        a direct touch type racial diaphragm valve having a valve seat and a diaphragm,
        an orifice formed of a ring-shaped clearance between the valve seat of the direct touch type metal diaphragm valve and the diaphragm,
        an orifice opening degree arithmetic and control unit, a stepping motor operably connected to be driven in response to an orifice control signal from the orifice opening degree arithmetic and control unit,
an eccentric cam operably connected to be turned by the stepping motor,
a diaphragm presser, and
a direct touch type metal diaphragm valve having a valve opening degree arranged to be controlled by the eccentric cam via the diaphragm presser;
wherein the variable orifice type pressure-controlled flow controller is arranged to
compute a flow rate of a fluid distributed through the orifice of the variable orifice unit according to the formula $Q_{P1}=KP_1$ (wherein $P_1$ is an orifice upstream side pressure and K is a constant), and
switch a flow control range, and
perform flow control in a predetermined flow control range by changing a set flow rate signal Qs for the flow rate arithmetic and control unit of the pressure control unit and an orifice opening degree setting signal Qz for an orifice opening degree arithmetic and control unit of the variable orifice unit; and
a control unit including the flow rate arithmetic and control unit of the pressure control unit and the orifice opening degree arithmetic and control unit of the variable orifice unit;
wherein the control unit is arranged to, when the set flow rate signal changes according to switching of the flow control range, input an orifice opening signal into the orifice opening degree arithmetic and control unit simultaneously with the change in the set flow rate signal to increase the orifice opening degree of the variable orifice unit, and, after a predetermined time elapses, input a predetermined orifice opening degree setting signal into the orifice opening degree arithmetic and control unit to keep the orifice opening degree at the desired predetermined opening degree.

8. The variable orifice type pressure-controlled flow controller according to claim 7, wherein a fluid passage hole diameter of the valve seat of the direct touch type metal diaphragm valve forming the variable orifice is set to 0.1 to 0.5 mm, and the 100% set flow rate is set to 10 sccm.

9. The variable orifice type pressure-controlled flow controller according to claim 7, wherein a shut-off valve is disposed in the upstream side passage of the variable orifice of the variable orifice unit.

10. The variable orifice type pressure-controlled flow controller of claim 9, wherein a fluid passage hole diameter of the valve seat of the direct touch type metal diaphragm valve forming the variable orifice is set to 0.1 to 0.5 mm, and the 100% set flow rate is set to 10 sccm.

11. A variable orifice type pressure-controlled flow controller, comprising:

a pressure control unit;
a variable orifice unit including,
a direct touch type metal diaphragm valve having a valve seat and a diaphragm,
an orifice formed of a ring-shaped clearance between the valve seat of the direct touch type metal diaphragm valve and the diaphragm,
an orifice opening degree arithmetic and control unit,
a stepping motor operably connected to be driven in response to an orifice control signal from the orifice opening degree arithmetic and control unit,
an eccentric cam operably connected to be turned by the stepping motor,
a diaphragm presser, and
a direct touch type metal diaphragm valve having a valve opening degree arranged to be controlled by the eccentric cam via the diaphragm presser,
wherein the variable orifice type pressure-controlled flow controller is arranged to
compute a flow rate of a fluid distributed through the orifice of the variable orifice unit according to the formula $Q_{P1}=KP_1$ (wherein $P_1$ is an orifice upstream side pressure and K is a constant), and
switch a flow control range, and
perform flow control in a predetermined flow control range by changing a set flow rate signal Qs for the flow rate arithmetic and control unit of the pressure control unit and an orifice opening degree setting signal Qz for an orifice opening degree arithmetic and control unit of the variable orifice unit; and
a control unit including the flow rate arithmetic and control unit of the pressure control unit and the orifice opening degree arithmetic and control unit of the variable orifice unit,
wherein the control unit is arranged to, when the set flow rate signal changes according to switching of the flow control range, input an orifice opening signal into the orifice opening degree arithmetic and control unit simultaneously with the change in the set flow rate signal to increase the orifice opening degree of the variable orifice unit, and, after a predetermined time elapses, input a predetermined orifice opening degree setting signal into the orifice opening degree arithmetic and control unit to keep the orifice opening degree at the desired predetermined opening degree, and
wherein the variable orifice opening degree is kept at a degree being 1.5 times or more larger than the opening degree in the set flow rate range for 0.1 to 0.5 seconds, and the lowering time from the 100% set flow rate to a 20% set flow rate during flow control is within 1 second.

* * * * *